US009965718B2

(12) United States Patent
Arthur et al.

(10) Patent No.: US 9,965,718 B2
(45) Date of Patent: *May 8, 2018

(54) PROVIDING TRANSPOSABLE ACCESS TO A SYNAPSE ARRAY USING A RECURSIVE ARRAY LAYOUT

(71) Applicant: INTERNATIONAL BUSINESS MACHINES CORPORATION, Armonk, NY (US)

(72) Inventors: John V. Arthur, Mountian View, CA (US); John E. Barth, Jr., Williston, VT (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/846,259

(22) Filed: Sep. 4, 2015

(65) Prior Publication Data

US 2015/0379396 A1 Dec. 31, 2015

Related U.S. Application Data

(63) Continuation of application No. 13/562,195, filed on Jul. 30, 2012, now Pat. No. 9,218,564.

(51) Int. Cl.
*G06N 3/04* (2006.01)
*G06N 3/063* (2006.01)
*G06N 3/08* (2006.01)

(52) U.S. Cl.
CPC ............. *G06N 3/0635* (2013.01); *G06N 3/04* (2013.01); *G06N 3/049* (2013.01); *G06N 3/063* (2013.01); *G06N 3/08* (2013.01)

(58) Field of Classification Search
CPC .. G06N 3/02; G06N 3/04; G06N 3/08; G06N 3/0635; G06N 3/049; G06N 3/063
See application file for complete search history.

(56) References Cited

U.S. PATENT DOCUMENTS

| | | |
|---|---|---|
| 4,493,048 A | 1/1985 | Kung et al. |
| 4,807,168 A | 2/1989 | Moopen et al. |
| 5,014,235 A | 5/1991 | Morton |

(Continued)

OTHER PUBLICATIONS

FPGA-based Architecture for Real-time Synaptic Plasticity Computation, by Belhadj, published 2008.*

(Continued)

*Primary Examiner* — Ben Rifkin
(74) *Attorney, Agent, or Firm* — Sherman IP LLP; Kenneth L. Sherman; Hemavathy Perumal

(57) ABSTRACT

Embodiments of the invention relate to providing transposable access to a synapse array using a recursive array layout. One embodiment comprises maintaining synaptic weights for multiple synapses connecting multiple axons and multiple neurons, wherein the synaptic weights are maintained based on a recursive array layout. The recursive array layout facilitates transposable access to the synaptic weights. A neuronal spike event between an axon and a neuron is communicated via a corresponding connecting synapse by accessing the synaptic weight of the corresponding connecting synapse in the recursive array layout.

14 Claims, 14 Drawing Sheets

(56) References Cited

U.S. PATENT DOCUMENTS

| | | | |
|---|---|---|---|
| 5,023,833 | A | 6/1991 | Baum et al. |
| 5,083,044 | A | 1/1992 | Mead et al. |
| 5,148,514 | A | 9/1992 | Arima et al. |
| 5,293,457 | A | 3/1994 | Arima et al. |
| 5,299,286 | A | 3/1994 | Imondi et al. |
| 5,303,329 | A | 4/1994 | Mead et al. |
| 5,600,843 | A | 2/1997 | Kato et al. |
| 5,781,702 | A | 7/1998 | Alhalabi |
| 6,463,438 | B1 | 10/2002 | Veltri et al. |
| 7,457,787 | B1 | 11/2008 | Furber |
| 7,958,071 | B2 | 6/2011 | Snider et al. |
| 8,275,727 | B2 | 9/2012 | Elmegreen et al. |
| 8,417,873 | B1 * | 4/2013 | Karamcheti ........ G06F 12/0246 711/103 |
| 8,812,415 | B2 | 8/2014 | Moda |
| 2010/0312731 | A1 | 12/2010 | Knoblauch |
| 2014/0344201 | A1 | 11/2014 | Arthur et al. |

OTHER PUBLICATIONS

Analyzing Block Locality in Morton-Order and Morton-Hybrid Matrices, by Lorton, published 2006.*

Schoenauer, T. et al., "Digital Neurohardware: Principles and Perspectives," Proceedings of the Third International Neuronal Networks in Applications Workshop (NN '98), 1998, pp. 101-106, Otto-von-Guericke University of Magdeburg, Germany.

Jahnke, A. et al., "Simulation of Spiking Neural Networks on Different Hardware Platforms," Proceedings of the 7th International Conference on Artificial Neural Networks (ICANN '97), 1997, pp. 1187-1192, Springer-Verlag, London, United Kingdom.

Kashefi, F., "Rapidly Training Device for Fiber Optic Neural Network," Doctoral Dissertation, 1999, pp. 1-240, The University of Texas at Dallas, United States.

Aoyama, Y. et al., "RS/6000 SP: Practical MPI Programming," IBM Redbooks Publication, Aug. 1999, First Edition, pp. 1-238, IBM Corporation, United States.

Serrano-Gotarredona, R. et al., "On Event Generators for Address Event Representation Transmitters," Proceedings of the SPIE, 2005, pp. 148-159, vol. 5839, SPIE, United States.

Belhadj, B. et al., "FPGA-based Architecture for Real-time Synaptic Plasticity Computation", Proceedings of the 2008 15th International Conference on Electronics, Circuits and Systems (ICES 2008), Aug. 31, 2008-Sep. 3, 2008, pp. 1-4, IEEE, United States.

Lorton, K.P. et al., "Analyzing Block Locality in Morton-Order and Morton-Hybrid Matrices", Proceedings of the 2006 MEDEA Conference, Sep. 2007, pp. 1-7, vol. 35, No. 4, ACM, United States.

Lim, W. et al., "Evaluating ISA Support and Hardware Support for Recursive Data Layouts", Proceedings of the 14th International Conference of High Performance Computing (HIPC 27), Dec. 18-21, 2007, pp. 95-106, Springer-Verlag Berlin Heidelberg, Germany.

Boahen, K.A., "A Burst-Mode Word-Serial Address-Event Link—II: Receiver Design", Proceedings of the 2007 IEEE Transactions on Circuits and Systems, Jul. 2004, pp. 1281-1291, vol. 51, No. 7, IEEE, United States.

U.S. Non-Final Office Action for U.S. Appl. No. 13/562,195 dated Jun. 18, 2014.

U.S. Final Office Action for U.S. Appl. No. 13/562,195 dated Dec. 26, 2014.

U.S. Advisory Action for U.S. Appl. No. 13/562,195 dated Mar. 3, 2015.

U.S. Non-Final Office Action for U.S. Appl. No. 13/562,195 dated Apr. 9, 2015.

U.S. Notice of Allowance for U.S. Appl. No. 13/562,195 dated Aug. 14, 2015.

U.S. Notice of Allowance for U.S. Appl. No. 13/562,203 dated Aug. 14, 2014.

U.S. Notice of Allowability for U.S. Appl. No. 13/562,203 dated Sep. 23, 2014.

* cited by examiner

US 9,965,718 B2

PROVIDING TRANSPOSABLE ACCESS TO A SYNAPSE ARRAY USING A RECURSIVE ARRAY LAYOUT

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, providing transposable access to a synapse array using a recursive array layout.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to providing transposable access to a synapse array using a recursive array layout. One embodiment comprises maintaining synaptic weights for multiple synapses connecting multiple axons and multiple neurons, wherein the synaptic weights are maintained based on a recursive array layout. The recursive array layout facilitates transposable access to the synaptic weights. A neuronal spike event between an axon and a neuron is communicated via a corresponding connecting synapse by accessing the synaptic weight of the corresponding connecting synapse in the recursive array layout.

Another embodiment comprises a neural network including an interconnect fabric comprising multiple electronic synapses interconnecting multiple electronic axons with multiple electronic neurons. Each synapse interconnects an axon with a neuron. The interconnect fabric is organized based on the recursive array layout for transposable access to one or more of the synapses.

These and other features, aspects and advantages of the present invention will become understood with reference to the following description, appended claims and accompanying figures.

DETAILED DESCRIPTION

Figure 1:
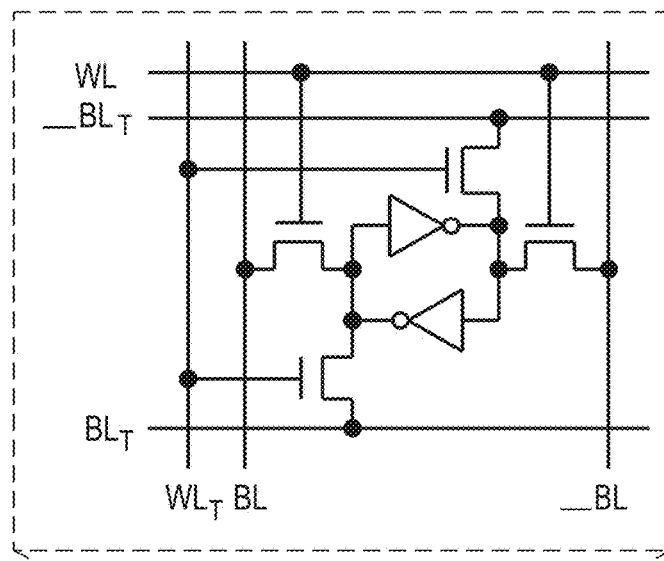
FIG. 1 shows a transposable random access memory crossbar array.
Figure 1:
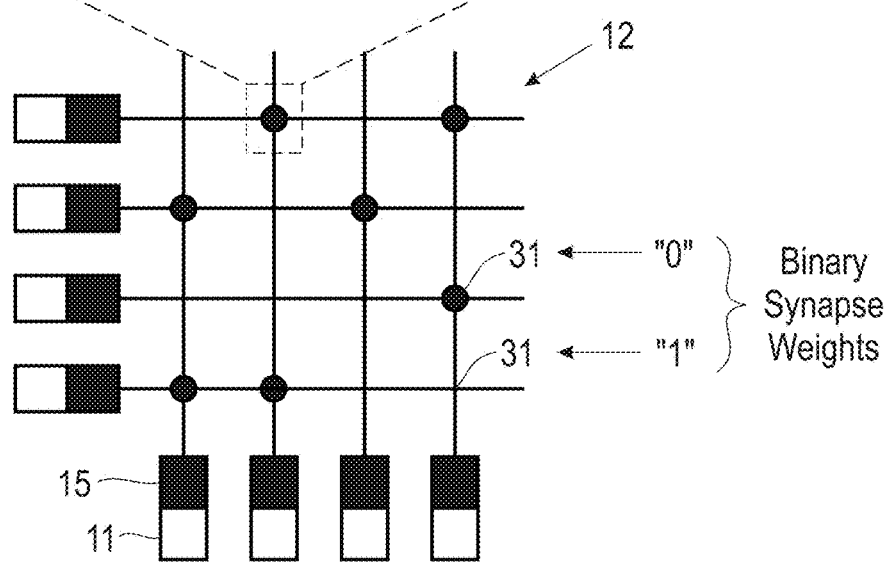

Embodiments of the invention relate to providing transposable access to a synapse array using a recursive array layout. One embodiment comprises maintaining synaptic weights for multiple synapses connecting multiple axons and multiple neurons, wherein the synaptic weights are maintained based on a recursive array layout. The recursive array layout facilitates transposable access to the synaptic weights. A neuronal spike event between an axon and a neuron is communicated via a corresponding connecting synapse by accessing the synaptic weight of the corresponding connecting synapse in the recursive array layout.

Another embodiment comprises a neural network including an interconnect fabric comprising multiple electronic synapses interconnecting multiple electronic axons with multiple electronic neurons. Each synapse interconnects an axon with a neuron. The interconnect fabric is organized based on the recursive array layout for transposable access to one or more of the synapses.

In one embodiment, the interconnect fabric further comprises a crossbar having N rows and N columns. The crossbar includes the synapses. The interconnect fabric further comprises an access module for transposable access to one or more of the synapses based on the recursive array layout. The number of read memory accesses required to read a column of the crossbar is the same as the number of read memory accesses required to read a row of the crossbar. The number of write memory accesses required to write a column of the crossbar is the same as the number of write memory accesses required to write a row of the crossbar.

In one embodiment, the crossbar is organized in a recursive manner. For example, information (e.g., synaptic weights) for each row and each column is distributed across at least one block of rows and columns, wherein the number of columns and the number rows in each block is equal to the square root of N. The number of read memory accesses required to read a row of the crossbar is the square root of N. The number of read memory accesses required to read a column of the crossbar is the square root of N. The number of write memory accesses required to write a row of the crossbar is the square root of N. The number of write memory accesses required to write a column of the crossbar is the square root of N.

For each synapse, a synaptic weight of said synapse is maintained in the crossbar. Spike events are received from the axons. For each axon that sends a spike event, the synaptic weight of a synapse connected to said axon is obtained from the crossbar. In one embodiment, obtaining the synaptic weight of a synapse comprises reading a row of the crossbar. In another embodiment, obtaining the synaptic weight of a synapse comprises reading a column of the crossbar.

For each spike event received, said spike event is sent to a target neuron. For each neuron receiving spike events, said neuron is updated to a new operational state based on the spike events received. A neuron receives a spike event from an interconnected axon via a conducting synapse.

For each synapse, the synaptic weight of said synapse is updated based on the operational states of a connected axon and a connected neuron. In one embodiment, updating the updating the synaptic weight of a synapse comprises writing a row of the crossbar, wherein the row written includes a new synaptic weight for said synapse. In another embodiment, updating the updating the synaptic weight of a synapse comprises writing a column of the crossbar, wherein the column written includes a new synaptic weight for said synapse.

In one embodiment, the recursive array layout is a Morton layout.

The term electronic neuron as used herein represents an architecture configured to simulate a biological neuron. An electronic neuron creates connections between processing elements that are roughly functionally equivalent to neurons of a biological brain. As such, a neuromorphic and synaptronic system comprising electronic neurons according to embodiments of the invention may include various electronic circuits that are modeled on biological neurons.

Further, a neuromorphic and synaptronic system comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic system according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment, or an embodiment containing both hardware and software elements.

Standard memories, such as static random access memory (SRAM) and embedded dynamic random access memory (eDRAM), are accessed in one dimension only. Specifically, standard memories are accessed by row (i.e., row-major) or column (i.e., column-major), but not both. For instance, in an N×N row-major memory having N rows and N columns, reading or writing a column requires N row accesses because all rows are scanned for every column event of the column. As such, to access ten columns, each row will be accessed ten times, that is one row access per time step. Accessing ten columns thereby results in a ten-fold increase in power use.

In event-driven neural architectures such as spiking neural networks, random access memories are used to represent synaptic connections between axons (i.e., pre-synaptic axons) and dendrites of neurons (i.e., post-synaptic neurons). Two-dimensional memory arrays that permit transposable access to a crossbar memory array within a time step are needed. Row and column read and write access of a memory array is necessary for learning rules in a crossbar memory array.

A transposable random access memory provides both row and column read and write access. A transposable random access memory, however, is larger, and tends to consume more power, than standard memories.

FIG. 1 shows a transposable random access memory crossbar array ("crossbar") 12 used in a neural network 10. The crossbar 12 comprises multiple synapses 31 that communicate events between pre-synaptic axons 15 and post-synaptic neurons 11. A learning rule such as STDP may be applied to update synaptic weights of the synapses 31. The synaptic weights may be represented as a weight matrix W corresponding to the synapses 31.

Based on a neuron spike, an axon 15 sends an event into the crossbar 12, wherein the weight matrix W is read and events are selectively sent out based on the synaptic weights, driving the neurons 11 to which the selected axon 15 connects. In one example, the crossbar 12 also communicates events symmetrically from the neurons 11 to the axons 15, wherein when a neuron 11 sends an event into the crossbar 12, the crossbar 12 reads the weight matrix W and sends out events to all of the axons 15 that are connected to the selected neurons 11. This symmetrical communication corresponds to a transposable weight matrix.

In one embodiment, the synapses 31 are binary memory devices, wherein each synapse can have a weight "0" indicating it is non-conducting, or a weight "1" indicating it is conducting. A horizontal update (axonal synapse update in crossbar 12) is for updating (setting/resetting) weights of synapses in a row of the crossbar 12, and a vertical update (dendritic synapse update in crossbar 12) is for updating (setting/resetting) weights of synapses in a column of the crossbar 12. For example, each synapse 31 may comprise a transposable 8-transistor (8-T) cell utilized for pre-synaptic (row) and post-synaptic (column) synapse updates. WL stands for horizontal (axonal) wordlines and $BL_T$ stands for horizontal (axonal) bitlines as for memory arrays. $WL_T$ stands for vertical (neuronal) wordlines and BL stands for vertical (neuronal) bitlines as for memory arrays. WL, $BL_T$, $\_BL_T$ (inversion of $BL_T$) are used for axonal updates of the synapse 31, and $WL_T$, BL, $\_BL$ (inversion of BL) are used for neuronal updates of the synapse 31.

Figure 2:
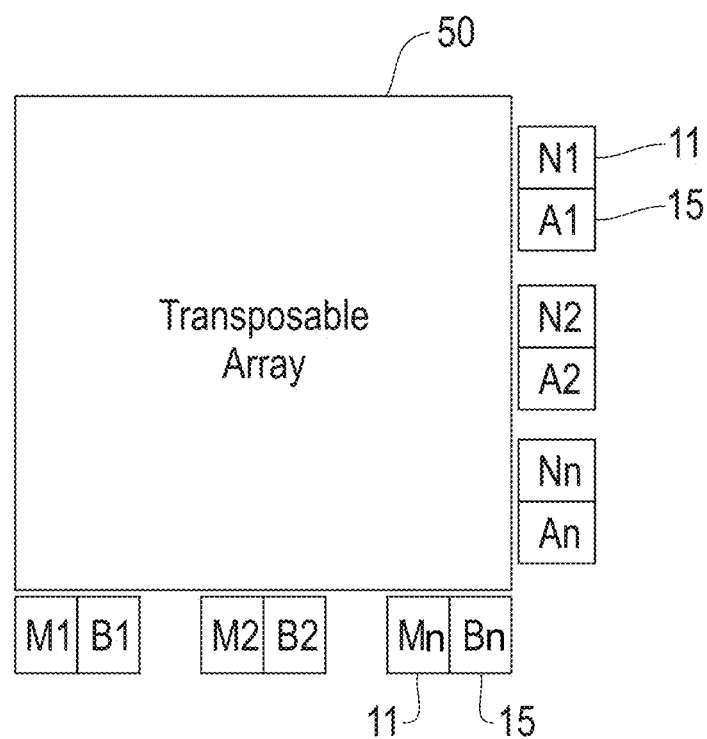
FIG. 2 shows a block diagram of a transposable random access memory.

FIG. 2 shows a block diagram of a transposable random access memory 50. The transposable random access memory 50 is used to represent synaptic connections between neurons 11 and axons 15, such as neurons N1, N2, . . . , Nn and M1, M2, . . . , Mn, and axons A1, A2, . . . , An and B1, B2, . . . , Bn.

Table 1 below provides example pseudo code, demonstrating read, set, reset operation sequence of the neurons 11 and axons 15 in conjunction with the transposable random access memory 50 in FIG. 2. A row-major read event drives the neurons M1, M2, . . . , Mn, and a column-major read event drives the neurons N1, N2, . . . , Nn. Both row-major and column-major write events implement synaptic learning.

TABLE 1

```
For i=1:n,
    If A_i is ON,
        Read row i, namely, W(i, :);
        For j=1:n,
            Update state of neuron M_j.
        Endfor;
    Endif;
Endfor;
For j=1:n,
    If B_j is ON,
        Read column j, namely, W(: , j);
        For i=1:n,
            Update state of neuron N_i.
        Endfor;
    Endif;
Endfor;
For j=1:n,
    Did neuron M_j fire?
Endfor;
For i=1:n,
    Did neuron N_i fire?
Endfor;
For j=1:n,
    If M_j fired,
        For i=1:n,
            deltaW(i, j) is determined (may be probabilistically)
    as a function of time(B_j) and time(A_i).
        Endfor;
        Read column j, namely, W(:, j);
        W(:, j) = W(:, j) − deltaW(:, j);
        Write column j, namely, W(:, j);
    Endif;
    If B_j fired,
        For i=1:n,
            deltaW(i, j) is determined (may be probabilistically)
    as a function of time(M_j) and time(A_i).
        Endfor;
        Read column j, namely, W(:, j);
        W(:, j) = W(:, j) + deltaW(:, j);
        Write column j, namely, W(:, j);
    Endif;
Endfor;
For i=1:n,
    If N_i fired,
        For j=1:n,
            deltaW(i, j) is determined (may be probabilistically)
    as a function of time(B_j) and time(A_i).
        Endfor;
        Read row i namely, W(i, :);
```

TABLE 1-continued

```
        W(i, :) = W(i, :) − deltaW(i, :);
        Write row i namely, W(i, :);
    Endif;
    If A_i fired,
        For j=1:n,
            deltaW(i, j) is determined (may be probabilistically)
    as a function of time(N_i) and time(A_i).
        Endfor;
        Read row i namely, W(i, :);
        W(i, :) = W(i, :) + deltaW(i, :);
        Write row i namely, W(i, :);
    Endif;
Endfor;
```

As stated above, a transposable random access memory is larger, and tends to consume more power, than a traditional random access memory. For example, a transposable random access memory is two to four times larger, and consumes twice as much leakage (i.e., passive) and active power, than a standard SRAM.

Embodiments of the present invention provide transposable access using standard or non-standard memory arrays, such as an SRAM, an eDRAM, or any other memory cell array. In one embodiment, the present invention provides transposable access to a memory cell array using column aggregation. In another embodiment, the present invention provides transposable access to a memory cell array using a recursive array layout.

Column Aggregation

Embodiments of the invention provide transposable access to a memory cell array. One embodiment emulates a transposable random access memory using column aggregation (i.e., dot product axon scheme) on standard and non-standard memories.

Figure 3:
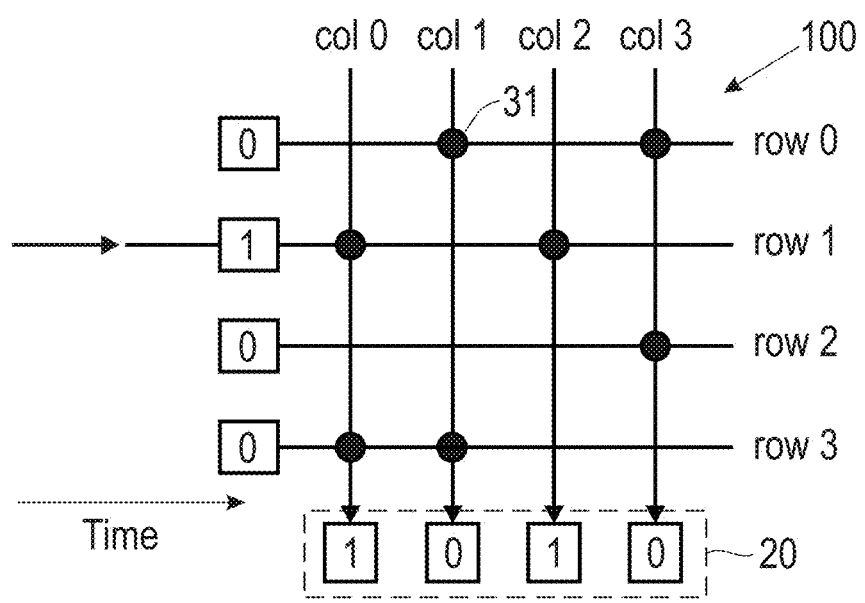
FIG. 3 illustrates row read/write access of a crossbar memory array using column aggregation, in accordance with an embodiment of the invention.

FIG. 3 illustrates row read/write access of a crossbar memory array 100 using column aggregation, in accordance with an embodiment of the invention. The crossbar 100 is an N×N memory array comprising N rows and N columns, such as rows 0, 1, 2, and 3, and columns 0, 1, 2, and 3. The crossbar 100 may be an SRAM, an eDRAM, or any memory cell array. The crossbar 100 comprises multiple synapses 31. Each synapse 31 may be identified by its Cartesian coordinates as (i, j), wherein i is a column index and j is a row index in the array 100. Specifically, the crossbar 100 includes synapses 31 with a weight "1" at coordinates (0, 1), (0, 3), (1, 0), (1, 2), (2, 3), (3, 0), and (3, 1).

In column aggregation, each read or write access of a row requires only one access within a time step. With each read or write access of a row, an output vector 20 (i.e., weight vector) corresponding to the weight of synapses 31 in said row is obtained. Each "1" value in an output vector 20 represents a synapse 31 with a weight "1" (i.e., the synapse is conducting). FIG. 3 illustrates read or write access of row 1 of the crossbar 100. The output vector 20 corresponding to the weight of synapses 31 in row 1 is <1, 0, 1, 0>.

Figure 4:
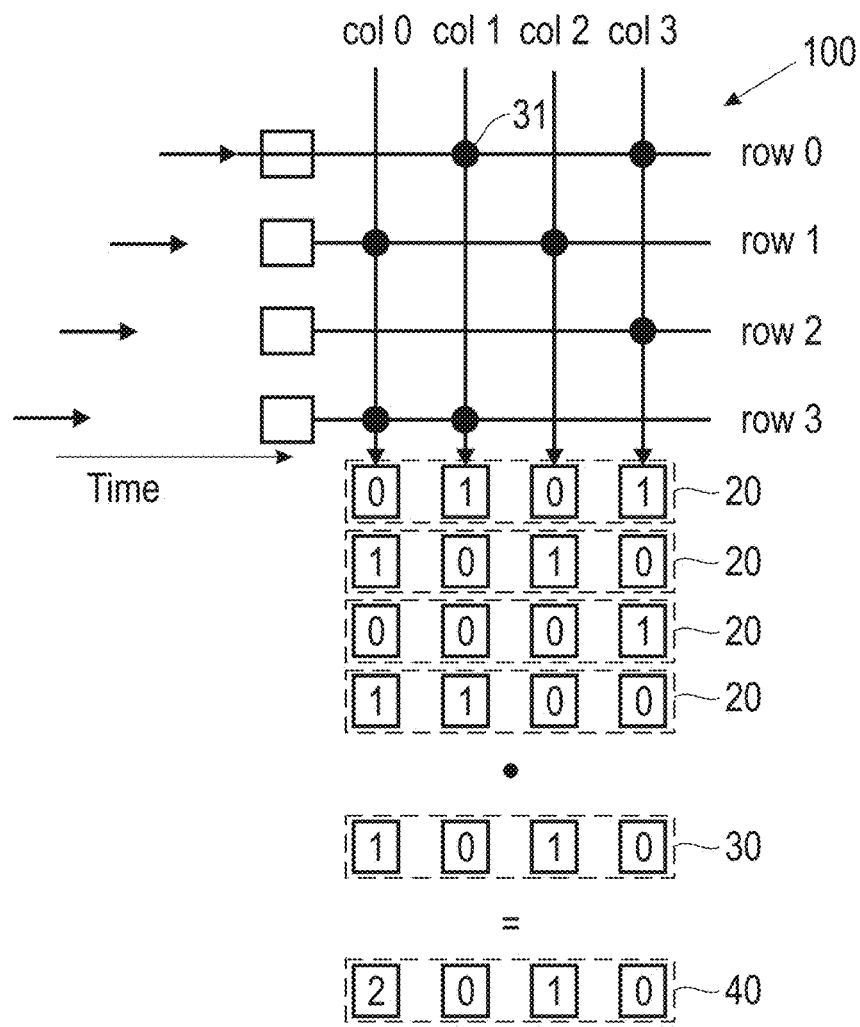
FIG. 4 illustrates column read/write access of a crossbar memory array using column aggregation, in accordance with an embodiment of the invention.

FIG. 4 illustrates column read/write access of the crossbar 100 using column aggregation, in accordance with an embodiment of the invention. In column aggregation, column read or write access is not performed individually. Rather, to enable transposable access to the crossbar 100 using column aggregation, the entire crossbar 100 is read out once. As such, a whole vector of columns are accessed at once. For instance, if two columns are to be accessed, all rows are accessed only once, not twice.

For a column read access, an axon vector ("axon vector") 30 is provided that indicates which pre-synaptic axons have generated spike events in the current time step. Specifically, each index in the axon vector 30 is associated with a column of the crossbar 100, and each index with a value of 1 indicates that the corresponding column should be accessed. For every axon vector 30 arriving in or before a previous time step, a read access of every row of the crossbar 100 is triggered. Every row of the crossbar 100 is accessed for a read within one time step, beginning with a read access of row 0 and ending with a read access of row N−1. Each row's output vector 20 is then multiplied (i.e., bitwise AND or dot product) with the axon vector 30 to produce an update vector 40 of indices. Each index in the update vector 40 corresponds to a neuron. The number of synaptic inputs a neuron receives is equal to the integer value of the index corresponding to the neuron in the update vector 40. For example, for each index in the update vector 40 with a "1" value, a corresponding neuron receives a synaptic input and is updated to a new operational state. For each index in the update vector 40 with a "2" value, a corresponding neuron receives two synaptic inputs and is updated to a new operational state.

For example, as shown in FIG. 4, an axon vector 30 with values <1, 0, 1, 0> is provided. The values <1, 0, 1, 0> of the axon vector 30 represent that columns 0 and 2 are to be accessed. The axon vector 30 triggers a read access of every row of the crossbar 100. Starting with row 0 and ending with row N−1, all rows of the crossbar 100 are read within one time step. Each row's output vector 20 is then multiplied with the axon vector 30. For instance, the output vector 20 of rows 0, 1, 2, and 3 are <0, 1, 0, 1>, <1, 0, 1, 0>, <0, 0, 0, 1>, and <1, 1, 0, 0>, respectively. The output vectors of rows 0, 1, 2, 3 are multiplied with the axon vector 30, resulting in the update vector 40 with values <2, 0, 1, 0>.

Using column aggregation allows for N transposable read operations to be performed with N access operations. In the case of using column aggregation for write operations, writing a row requires one access, and writing a column requires N accesses. If column aggregation is used on an eDRAM, the cost of writing a column is amortized as the entire memory is being re-written (i.e., refreshed) at a constant interval.

Figure 5:
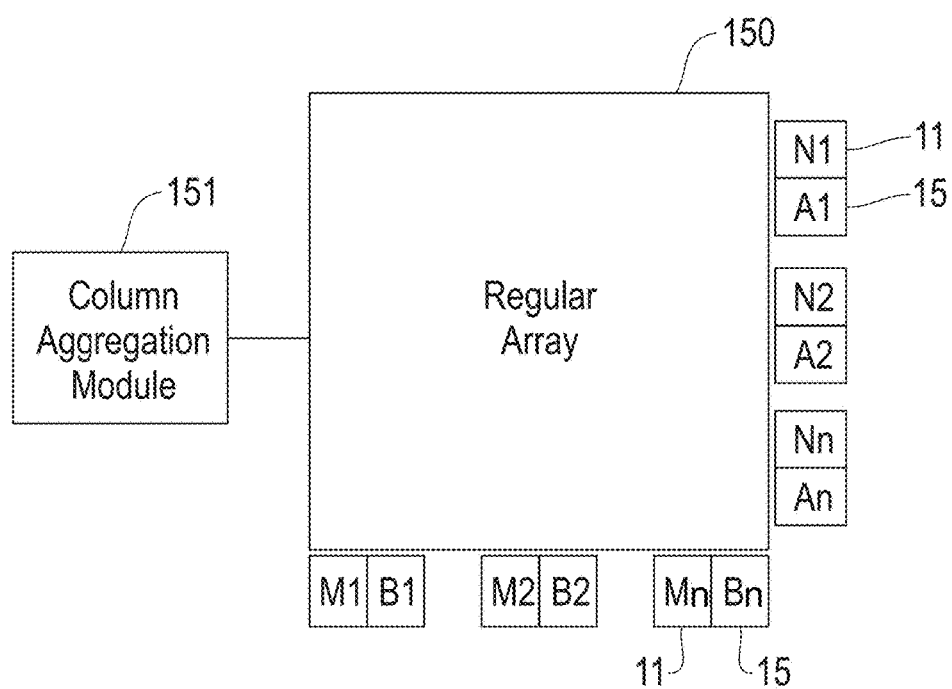
FIG. 5 shows a block diagram of a memory array with neurons and axons at the periphery, wherein the memory array uses column aggregation, in accordance with an embodiment of the invention.

FIG. 5 shows a block diagram of a memory array 150 with neurons 11 and axons 15 at the periphery, wherein the memory array 150 uses column aggregation, in accordance with an embodiment of the invention. The array 150 may be an SRAM or an eDRAM used to represent synaptic connections between neurons 11 and axons 15, such as neurons N1, N2, . . . , Nn and M1, M2, . . . , Mn, and axons A1, A2, . . . , An and B1, B2, . . . , Bn.

A column aggregation module 151 is connected to the array 150 for transposable access to one or more synapses of the array 150 using column aggregation. Table 2 below provides example pseudo code demonstrating the read, set, reset operation sequence of the neurons 11 and axons 15 for emulating a transposable memory array using column aggregation in conjunction with array 150 in FIG. 5.

TABLE 2

```
For i=1:n,
    If A_i is ON,
        Read row i, namely, W(i , :);
        For j=1:n,
            Update state of neuron M_j.
        Endfor;
    Endif;
Endfor;
//Dot product with B
For i=1:n,
```

TABLE 2-continued

```
    Read row i, namely, W(i , :);
        For j=1:n,
            If B_j is ON,
                Update state of neuron N_i by W(i,j).
            Endif;
        Endfor;
Endfor;
//End of dot product with B
For j=1:n,
    Did neuron M_j fire?
Endfor;
For i=1:n,
    Did neuron N_i fire?
Endfor;
For i=1:n,
    Read row i namely, W(i, :);
    For j=1:n,
        If B_j fired
            W(i, j) = W(i, j) + deltaW(i, j)
        Endif;
    Endfor;
    Write row i namely, W(i, :);
Endfor;
For i=1:n,
    Read row i namely, W(i, :);
    For j=1:n,
        If M_j fired
            W(i, j) = W(i, j) + deltaW(i, j)
        Endif;
    Endfor;
    Write row i namely, W(i, :);
Endfor;
For i=1:n,
    If N_i fired,
        For j=1:n,
            deltaW(i, j) is determined (may be probabilistically)
    as a function of time(B_j) and time(A_i).
        Endfor;
        Read row i namely, W(i, :);
        W(i, :) = W(i, :) − deltaW(i, :);
        Write row i namely, W(i, :);
    Endif;
    If A_i fired,
        For j=1:n,
            deltaW(i, j) is determined (may be probabilistically)
    as a function of time(N_i) and time(A_i).
        Endfor;
        Read row i namely, W(i, :);
        W(i, :) = W(i, :) + deltaW(i, :);
        Write row i namely, W(i, :);
    Endif;
Endfor;
```

Column aggregation reduces the number of memory accesses per spike or per time step. Column aggregation helps to save power and increase performance in a crossbar-based neural architecture with reciprocal weight matrix access, especially for moderate to high event rates.

Recursive Array Layout

Another embodiment of the invention emulates a transposable random access memory array using a recursive array layout, such as a Morton layout, on standard and non-standard memories.

Figure 6:
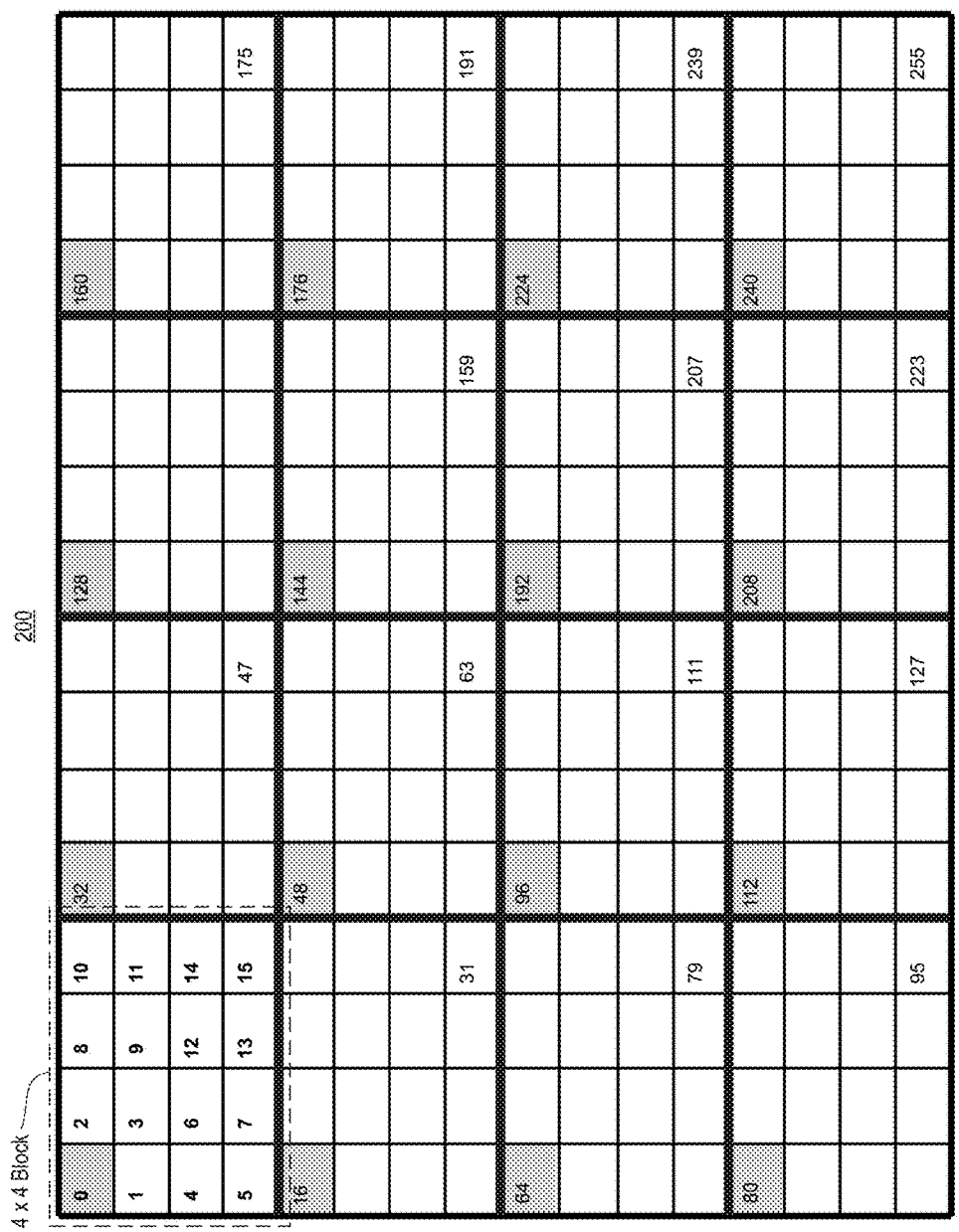
FIG. 6 illustrate an example memory array organized using a recursive array layout, in accordance with an embodiment of the invention.
Figure 7:
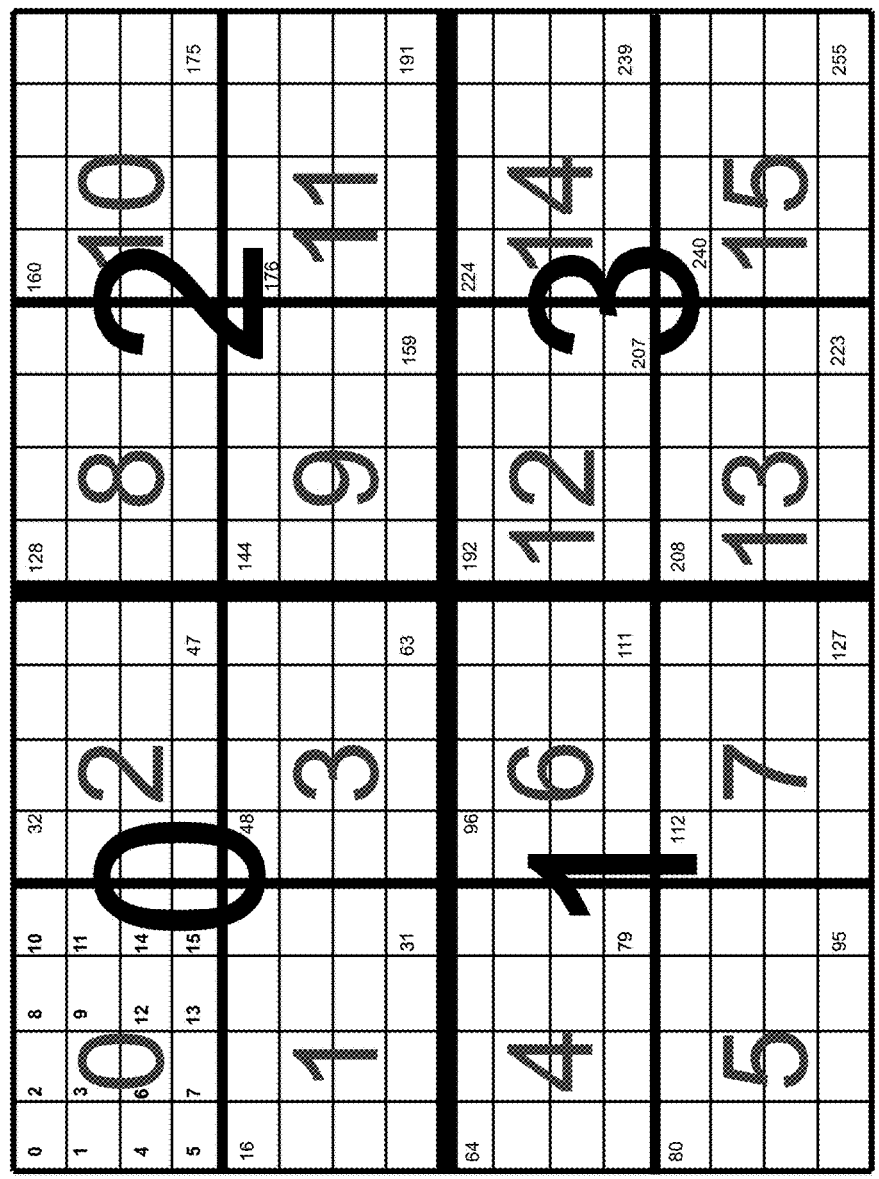
FIG. 7 illustrate an example memory array organized using a recursive array layout, in accordance with an embodiment of the invention.

FIGS. 6-7 illustrate an example memory array 200 organized using a recursive array layout, in accordance with an embodiment of the invention. The array 200 is a 16×16 memory array storing 256 bits total (bits 0 to 255).

Organizing an N×N memory array (i.e., a memory array having N rows and N columns) using a Morton layout requires re-arranging the bits of the memory array such that the bits are divided into $\sqrt{N} \times \sqrt{N}$ blocks, each block including N bits total. Each row read in the re-organized memory retrieves an equal amount of row and column data from the original mapping, and requires $\sqrt{N}$ accesses to retrieve all the data for any particular row or column. For example, the bits of the array 200 are divided into multiple 4×4 blocks, each block including 16 bits total. There are 16 blocks total in the array 200 (i.e., block 0, block 1, . . . , block 15), wherein each block represents a different row of the array 200. Referring to FIG. 6, block 0 comprising bits 0 to 15 represents row 0 of the array 200.

The array 200 further comprises 16 columns, each column including 16 bits that are distributed across the array 200. The bits of each column are distributed such that each 4×4 block of the array 200 will comprise a bit of said column. Referring to FIGS. 6-7, column 0 comprises bit 0 of block 0, bit 16 of block 1, bit 32 of block 2, bit 48 of block 3, bit 64 of block 4, bit 80 of block 5, bit 96 of block 6, bit 112 of block 7, bit 128 of block 8, bit 144 of block 9, bit 160 of block 10, bit 176 of block 11, bit 192 of block 12, bit 208 of block 13, bit 224 of block 14, and bit 240 of block 15.

Recursive memory organization adopts a share the pain strategy. For an N×N memory array organized using recursive memory organization, row read or write access requires IN accesses. Referring back to FIGS. 6-7, row read or write access of the array 200 requires √16 or 4 accesses. For instance, to read row 0 represented by block 0, the following four read accesses are required: 1) a first read access of a first horizontal row of the array 200 to retrieve the values of bits 0, 2, 8, and 10; 2) a second read access of a second horizontal row of the array 200 to retrieve the values of bits 1, 3, 9, and 11; 3) a third read access of a third horizontal row of the array 200 to retrieve the values of bits 4, 6, 12, and 14; and 4) a fourth and final read access of a fourth horizontal row of the array 200 to retrieve the values of bits 5, 7, 13, and 15.

Similarly, for an N×N memory array organized using recursive memory organization, a column read or write access requires √N accesses. Referring back to FIGS. 6-7, column read or write access requires √16 or 4 accesses. For instance, to read column 0, the following four read accesses are required: 1) a first read access of a first horizontal row of the array 200 to retrieve the values of bits 0, 32, 128, and 160; 2) a second read access of a fifth horizontal row of the array 200 to retrieve the values of bits 16, 48, 144, and 176; 3) a third read access of a ninth horizontal row of the array 200 to retrieve the values of bits 64, 96, 192, and 224; and 4) a fourth and final read access of a thirteenth horizontal row of the array 200 to retrieve the values of bits 80, 112, 208, and 240.

Read or write access of a column or row is sequenced over √N sub-steps within a time step. The √N sub-steps can be pipelined and interwoven to increase performance. For instance, assuming N=256 and time step for a neuron update is 1 ms, the entire operation can be completed in 512 MHz.

The memory array 200 may be organized using other recursive layouts.

Figure 8:
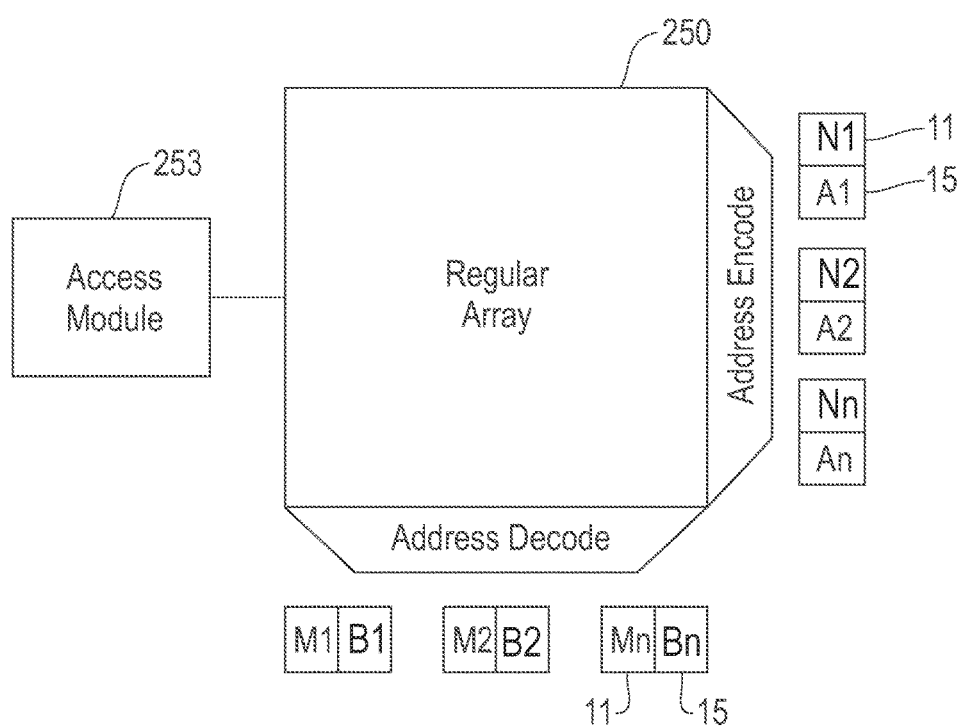
FIG. 8 shows a block diagram of a memory array with neurons and axons at the periphery, wherein the memory array is organized based on a recursive array layout, in accordance with an embodiment of the invention.

FIG. 8 shows a block diagram of a memory array 250 with neurons 11 and axons 15 at the periphery, wherein the memory array 250 is organized based on a recursive array layout, in accordance with an embodiment of the invention. The array 250 may be an SRAM or an eDRAM used to represent synaptic connections between neurons 11 and axons 15, such as neurons N1, N2, . . . , Nn and M1, M2, . . . , Mn, and axons A1, A2, . . . , An and B1, B2, . . . , Bn.

An access module 253 is connected to the array 250 for transposable access to one or more synapses of the array 250 based on the recursive array layout. The axons 15 transmit events to an access module 253. The access module 253 controls the sequence of operations to read or write a given row or column. Specifically, the access module 253 drives address encoders in sequence. Further, the access module 253 controls address decoders used in reconstructing the row or column to transmit to the neurons 11.

Table 3 below provides example pseudo code demonstrating the read, set, reset operation sequence of the neurons 11 and the axons 15 for emulating a transposable memory array using a recursive array layout in conjunction with array 250 in FIG. 8.

TABLE 3

```
For i=1:n,
    If A_i is ON,
        //Read access of row i is sequenced over √n sub-steps
        Read row i, namely, W(i, :);
        For j=1:n,
            Update state of neuron M_j.
        Endfor;
    Endif;
Endfor;
For j=1:n,
    If B_j is ON,
        //Read access of column j is sequenced over √n sub-steps
        Read column j, namely, W(: , j);
        For i=1:n,
            Update state of neuron N_i.
        Endfor;
    Endif;
Endfor;
For j=1:n,
    Did neuron M_j fire?
Endfor;
For i=1:n,
    Did neuron N_i fire?
Endfor;
For j=1:n,
    If M_j fired,
        For i=1:n,
            deltaW(i, j) is determined (may be probabilistically)
as a function of time(B_j) and time(A_i).
        Endfor;
        //Write access of column j is sequenced over √n sub-steps
        Read column j, namely, W(:, j);
        W(:, j) = W(:, j) − deltaW(:, j);
        Write column j, namely, W(:, j);
    Endif;
    If B_j fired,
        For i=1:n,
            deltaW(i, j) is determined (may be probabilistically)
as a function of time(M_j) and time(A_i).
        Endfor;
        //Write access of column j is sequenced over √n sub-steps
        Read column j, namely, W(:, j);
        W(:, j) = W(:, j) + deltaW(:, j);
        Write column j, namely, W(:, j);
    Endif;
Endfor;
For i=1:n,
    If N_i fired,
        For j=1:n,
            deltaW(i, j) is determined (may be probabilistically)
as a function of time(B_j) and time(A_i).
        Endfor;
        //Write access of row i is sequenced over √n sub-steps
        Read row i namely, W(i, :);
        W(i, :) = W(i, :) − deltaW(i, :);
        Write row i namely, W(i, :);
    Endif;
    If A_i fired,
        For j=1:n,
            deltaW(i, j) is determined (may be probabilistically)
as a function of time(N_i) and time(A_i).
        Endfor;
        //Write access of row i is sequenced over √n sub-steps
        Read row i namely, W(i, :);
        W(i, :) = W(i, :) + deltaW(i, :);
        Write row i namely, W(i, :);
    Endif;
Endfor;
```

Recursive array layout reduces the number of memory accesses per spike or per time step. Recursive array layout helps to save power and increase performance in a crossbar-based neural architecture with reciprocal weight matrix access, especially for low event rates.

Figure 9:
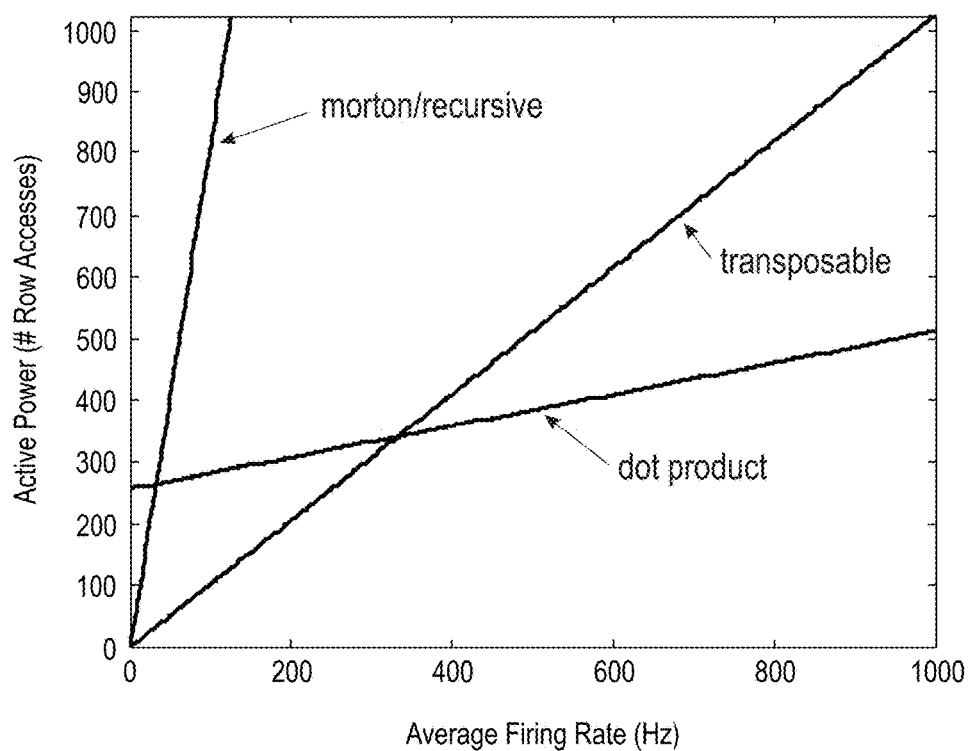
FIG. 9 shows an example graph plotting the active power consumed in a transposable memory array (transposable), a memory array using column aggregation scheme (dot product), and a memory array using a recursive array layout scheme (morton/recursive), in accordance with an embodiment of the invention.

FIG. 9 shows an example graph plotting the active power consumed in a transposable memory array (transposable), a memory array using column aggregation scheme (dot product), and a memory array using a recursive array layout scheme (morton/recursive), in accordance with an embodiment of the invention. As shown by the graph, the recursive array layout scheme consumes more active power than a transposable memory array. This is because the recursive array layout scheme requires $\sqrt{N}$ times more operations on word lines.

Figure 10:
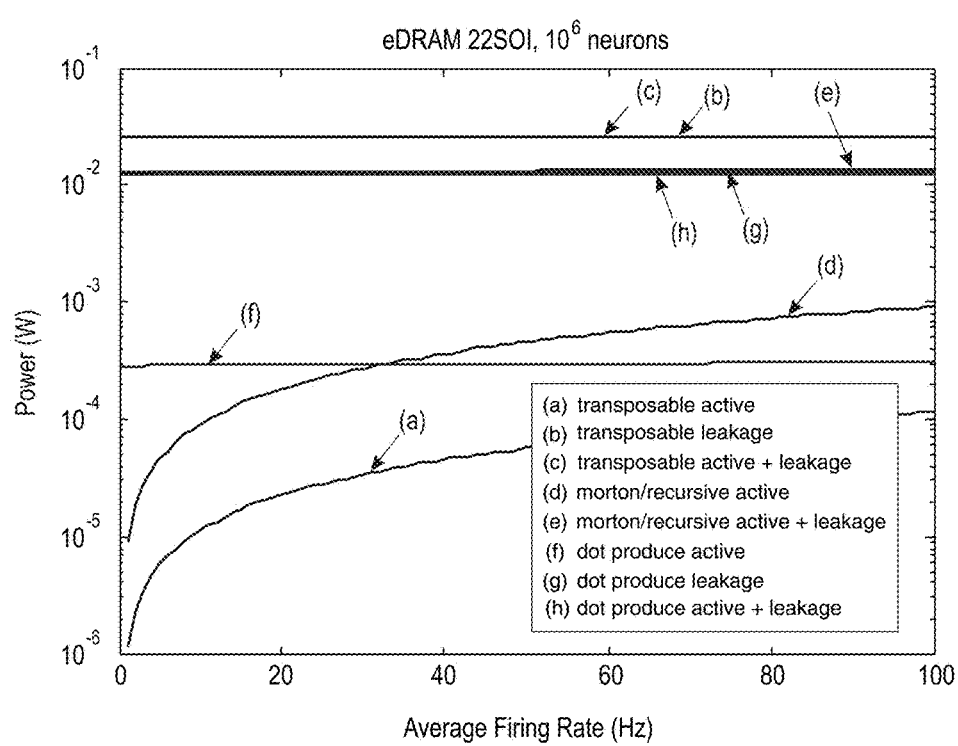
FIG. 10 shows an example graph plotting low leakage power and performance in a transposable memory array (transposable), a memory array using column aggregation scheme (dot product), and a memory array using a recursive array layout scheme (morton/recursive), in accordance with an embodiment of the invention.

FIG. 10 shows an example graph plotting low leakage power and performance in a transposable memory array (transposable), a memory array using column aggregation scheme (dot product), and a memory array using a recursive array layout scheme (morton/recursive), in accordance with an embodiment of the invention. As shown in FIG. 10, the transposable memory array is lowest in active power but highest in leakage. The column aggregation and recursive array layout scheme are both low in leakage power. The column aggregation scheme is efficient at high spike rates (e.g., >30 Hz), whereas the recursive array layout scheme is efficient at low spike rates.

Figure 11:
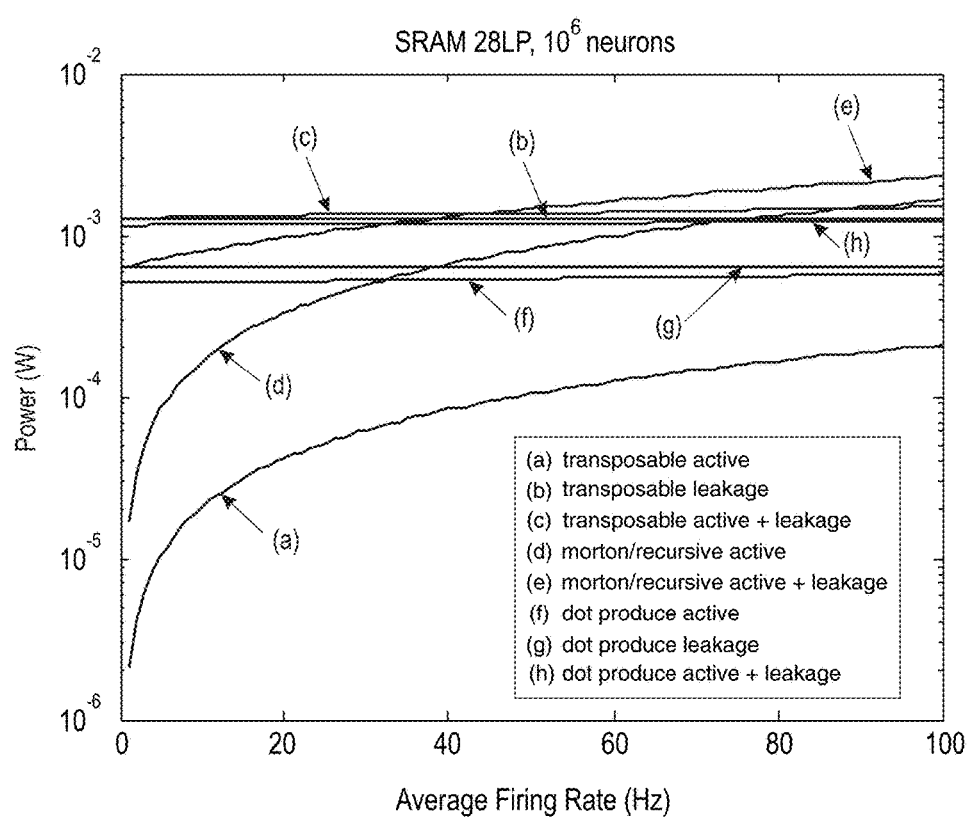
FIG. 11 shows an example graph plotting high leakage power and performance in a transposable memory array (transposable), a memory array using column aggregation scheme (dot product), and a memory array using a recursive array layout scheme (morton/recursive), in accordance with an embodiment of the invention.

FIG. 11 shows an example graph plotting high leakage power and performance in a transposable memory array (transposable), a memory array using column aggregation scheme (dot product), and a memory array using a recursive array layout scheme (morton/recursive), in accordance with an embodiment of the invention. As shown in FIG. 11, transposable memory array is highest in active power and leakage.

Figure 12:
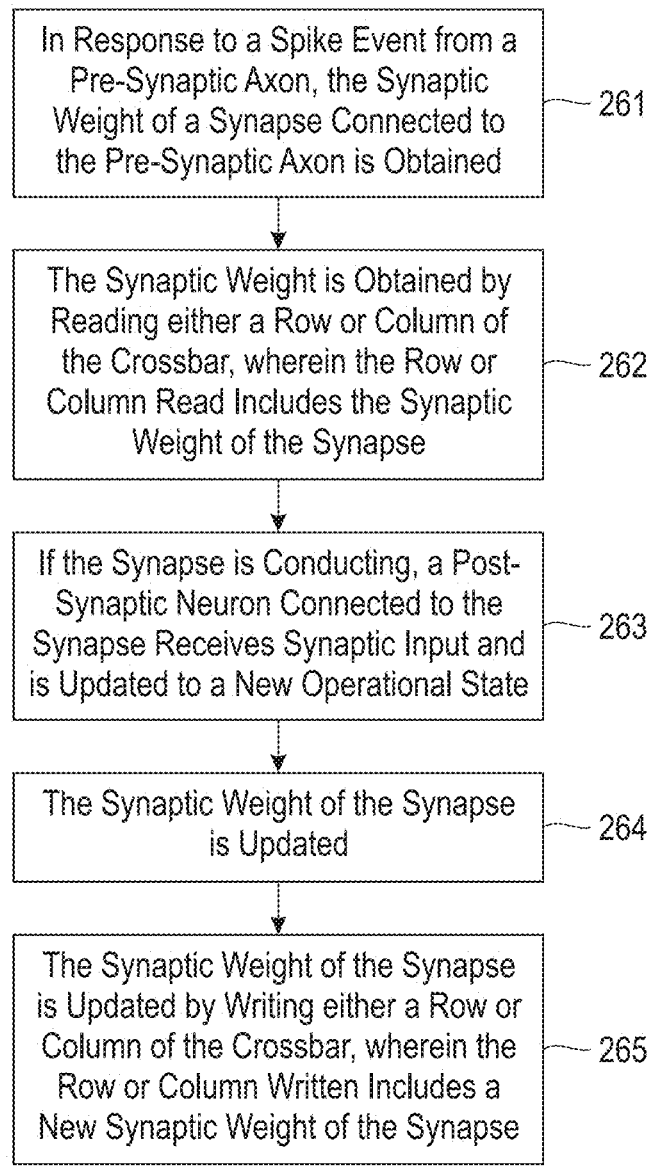
FIG. 12 illustrates a flowchart of an example process for a crossbar memory array using a recursive array layout scheme, in accordance with an embodiment of the invention.

FIG. 12 illustrates a flowchart of an example process 260 for a crossbar memory array using a recursive array layout scheme, in accordance with an embodiment of the invention. In process block 261, in response to a spike event from a pre-synaptic axon, the synaptic weight of a synapse connected to the pre-synaptic axon is obtained. In process block 262, the synaptic weight is obtained by reading either a row or column of the crossbar, wherein the row or column read includes the synaptic weight of the synapse. In process block 263, a post-synaptic neuron connected to the synapse receives synaptic input and is updated to a new operational state if the synaptic weight of the synapse indicates that the synapse is conducting. In process block 264, the synaptic weight of the synapse is updated (i.e., set or reset) to enable synaptic learning. In process block 265, the synaptic weight of the synapse is updated by writing either a row or column of the crossbar, wherein the row or column written includes an updated synaptic weight of the connected synapse.

Figure 13:
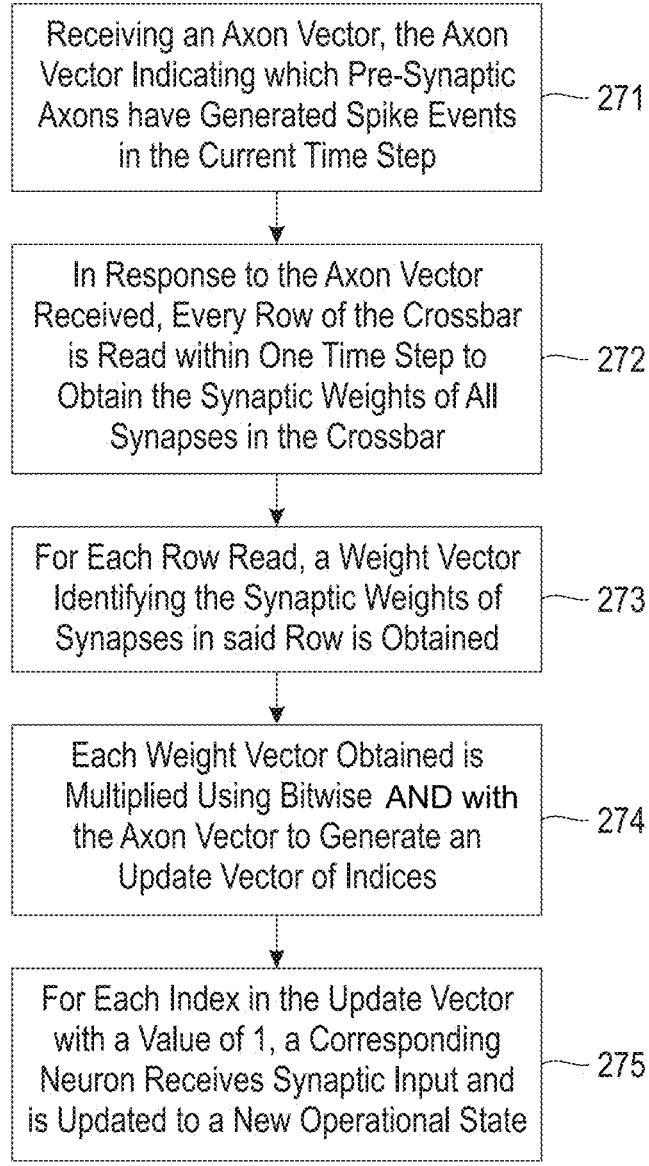
FIG. 13 illustrates a flowchart of an example read process for a crossbar memory array using a column aggregation scheme, in accordance with an embodiment of the invention.

FIG. 13 illustrates a flowchart of an example read process 270 for a crossbar memory array using a column aggregation scheme, in accordance with an embodiment of the invention. In process block 271, the crossbar receives an incoming column axon vector, the axon vector indicating which pre-synaptic axons have generated spike events. In process block 272, in response to the axon vector received, every row of the crossbar is read within one time step to obtain the synaptic weights of all synapses of the crossbar. In process block 273, for each row read, a weight vector identifying the synaptic weights of synapses in said row is obtained. In process block 274, each weight vector obtained is multiplied using bitwise AND with the axon vector to generate an update vector of indices. In process block 275, for each index in the update vector with a value of 1, a corresponding neuron receives a synaptic input and is updated to a new operational state.

Figure 14:
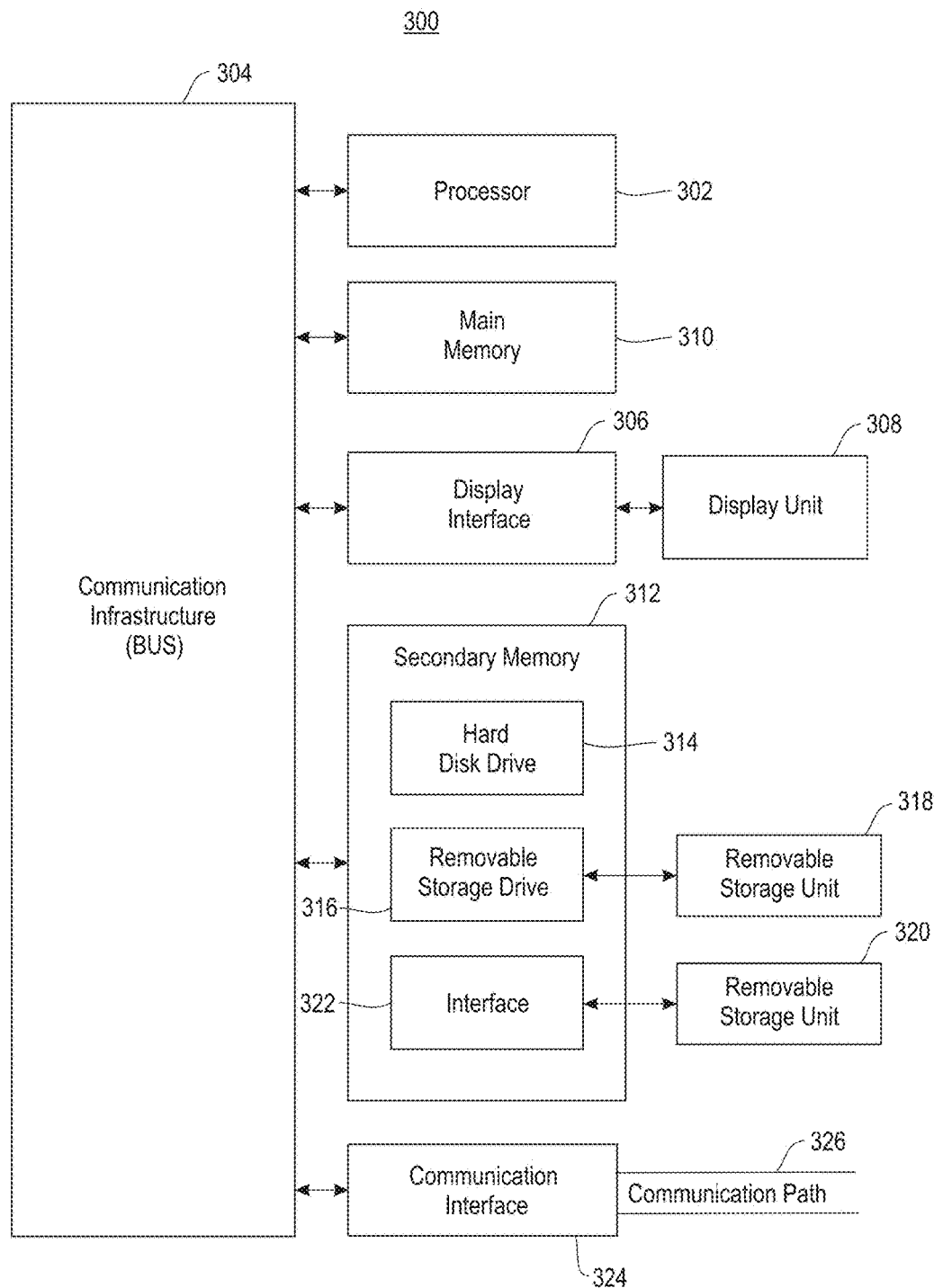
FIG. 14 shows a high level block diagram of an information processing system useful for implementing one embodiment of the present invention.

FIG. 14 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for neuromorphic event-driven neural computing in a scalable neural network. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   maintaining a memory array comprising a plurality of bits, wherein the bits represent a plurality of synaptic weights for a neural architecture including a plurality of synapses interconnecting a plurality of axons to a plurality of neurons, the plurality of axons divided into a first set of axons and a second set of axons, the plurality of neurons divided into a first set of neurons and a second set of neurons, each axon of the first set of axons interconnected to a neuron of the first set of neurons and proximate to another neuron of the second set of neurons, and each axon of the second set of axons interconnected to a neuron of the second set of neurons and proximate to another neuron of the first set of neurons; and
   reducing number of memory accesses per spike event by:
      re-arranging the bits of the memory array in accordance with a layout to obtain a weight matrix, wherein the weight matrix includes the same number of rows and columns;
      providing transposable access to the weight matrix by controlling read accesses and write accesses of the weight matrix, wherein each read access of a row or column of the weight matrix is sequenced over a pre-determined number of sub-steps within a time step, each write access to a row or column of the weight matrix is sequenced over the same pre-determined number of sub-steps within a time step, and the pre-determined number of sub-steps is equal to the square root of the number of rows included in the weight matrix; and
      in response to a spike event from an axon:
         obtaining a synaptic weight of a synapse connected to the axon from the weight matrix;
         in response to determining the synapse is a conducting synapse based on the synaptic weight obtained, communicating the spike event to a neuron interconnected to the axon via the synapse, and updating an operational state of the neuron; and
         updating the synaptic weight of the synapse in the weight matrix in response to the axon spiking or another neuron proximate to the axon spiking;
   wherein a synaptic weight of a synapse connected to an axon of the first set of axons is obtained via a read access of a row of the weight matrix and is updated via a write access to the same row; and
   wherein a synaptic weight of a synapse connected to an axon of the second set of axons is obtained via a read access of a column of the weight matrix and is updated via a write access to the same column.

2. The method of claim 1, wherein providing transposable access to the weight matrix reduces read accesses and write accesses of the weight matrix per spike event in comparison to another neural architecture that maintains synaptic weights in a memory that is accessed by row or column but not both.

3. The method of claim 1, wherein providing transposable access to the weight matrix conserves power and increases performance of the neural architecture in comparison to another neural architecture that maintains synaptic weights in a memory that is accessed by row or column but not both.

4. The method of claim 1, wherein providing transposable access to the weight matrix comprises organizing the weight matrix based on a recursive layout.

5. The method of claim 4, wherein:
   the weight matrix includes N rows and N columns;
   the pre-determined number of sub-steps is equal to the square root of N;
   a read access of a column of the weight matrix is sequenced over the same number of sub-steps within a time step as a read access of a row of the weight matrix; and
   a write access of a column of the weight matrix is sequenced over the same number of sub-steps within a time step as a write access of a row of the weight matrix.

6. A system comprising a computer processor, a computer-readable hardware storage device, and program code embodied with the computer-readable hardware storage device for execution by the computer processor to implement a method comprising:

maintaining a memory array comprising a plurality of bits, wherein the bits represent a plurality of synaptic weights for a neural architecture including a plurality of synapses interconnecting a plurality of axons to a plurality of neurons, the plurality of axons divided into a first set of axons and a second set of axons, the plurality of neurons divided into a first set of neurons and a second set of neurons, each axon of the first set of axons interconnected to a neuron of the first set of neurons and proximate to another neuron of the second set of neurons, and each axon of the second set of axons interconnected to a neuron of the second set of neurons and proximate to another neuron of the first set of neurons; and reducing number of memory accesses per spike event by:
re-arranging the bits of the memory array in accordance with a layout to obtain a weight matrix, wherein the weight matrix includes the same number of rows and columns;
providing transposable access to the weight matrix by controlling read accesses and write accesses of the weight matrix, wherein each read access of a row or column of the weight matrix is sequenced over a pre-determined number of sub-steps within a time step, each write access to a row or column of the weight matrix is sequenced over the same pre-determined number of sub-steps within a time step, and the pre-determined number of sub-steps is equal to the square root of the number of rows included in the weight matrix; and
in response to a spike event from an axon:
obtaining a synaptic weight of a synapse connected to the axon from the weight matrix;
in response to determining the synapse is a conducting synapse based on the synaptic weight obtained, communicating the spike event to a neuron interconnected to the axon via the synapse, and updating an operational state of the neuron; and
updating the synaptic weight of the synapse in the weight matrix in response to the axon spiking or another neuron proximate to the axon spiking;
wherein a synaptic weight of a synapse connected to an axon of the first set of axons is obtained via a read access of a row of the weight matrix and is updated via a write access to the same row; and
wherein a synaptic weight of a synapse connected to an axon of the second set of axons is obtained via a read access of a column of the weight matrix and is updated via a write access to the same column.

7. The system of claim 6, wherein providing transposable access to the weight matrix conserves power and increases performance of the neural architecture in comparison to another neural architecture that maintains synaptic weights in a memory that is accessed by row or column but not both.

8. The system of claim 6, wherein providing transposable access to the weight matrix conserves power and increases performance of the neural architecture in comparison to another neural architecture that maintains synaptic weights in a memory that is accessed by row or column but not both.

9. The system of claim 6, wherein providing transposable access to the weight matrix comprises organizing the weight matrix based on a recursive layout.

10. The system of claim 9, wherein:
the weight matrix includes N rows and N columns;
the pre-determined number of sub-steps is equal to the square root of N;
a read access of a column of the weight matrix is sequenced over the same number of sub-steps within a time step as a read access of a row of the weight matrix; and
a write access of a column of the weight matrix is sequenced over the same number of sub-steps within a time step as a write access of a row of the weight matrix.

11. A computer program product comprising a non-transitory computer-readable hardware storage medium having program code embodied therewith, the program code being executable by a computer to implement a method comprising:

maintaining a memory array comprising a plurality of bits, wherein the bits represent a plurality of synaptic weights for a neural architecture including a plurality of synapses interconnecting a plurality of axons to a plurality of neurons, the plurality of axons divided into a first set of axons and a second set of axons, the plurality of neurons divided into a first set of neurons and a second set of neurons, each axon of the first set of axons interconnected to a neuron of the first set of neurons and proximate to another neuron of the second set of neurons, and each axon of the second set of axons interconnected to a neuron of the second set of neurons and proximate to another neuron of the first set of neurons; and reducing number of memory accesses per spike event by:
re-arranging the bits of the memory array in accordance with a layout to obtain a weight matrix, wherein the weight matrix includes the same number of rows and columns;
providing transposable access to the weight matrix by controlling read accesses and write accesses of the weight matrix, wherein each read access of a row or column of the weight matrix is sequenced over a pre-determined number of sub-steps within a time step, each write access to a row or column of the weight matrix is sequenced over the same pre-determined number of sub-steps within a time step, and the pre-determined number of sub-steps is equal to the square root of the number of rows included in the weight matrix; and
in response to a spike event from an axon:
obtaining a synaptic weight of a synapse connected to the axon from the weight matrix;
in response to determining the synapse is a conducting synapse based on the synaptic weight obtained, communicating the spike event to a neuron interconnected to the axon via the synapse, and updating an operational state of the neuron; and
updating the synaptic weight of the synapse in the weight matrix in response to the axon spiking or another neuron proximate to the axon spiking;
wherein a synaptic weight of a synapse connected to an axon of the first set of axons is obtained via a read access of a row of the weight matrix and is updated via a write access to the same row; and
wherein a synaptic weight of a synapse connected to an axon of the second set of axons is obtained via a read access of a column of the weight matrix and is updated via a write access to the same column.

12. The computer program product of claim 11, wherein providing transposable access to the weight matrix conserves power and increases performance of the neural architecture in comparison to another neural architecture that maintains synaptic weights in a memory that is accessed by row or column but not both.

13. The computer program product of claim 11, wherein providing transposable access to the weight matrix conserves power and increases performance of the neural architecture in comparison to another neural architecture that maintains synaptic weights in a memory that is accessed by row or column but not both.

14. The computer program product of claim 11, wherein:
providing transposable access to the weight matrix comprises organizing the weight matrix based on a recursive layout;
the weight matrix includes N rows and N columns;
the pre-determined number of sub-steps is equal to the square root of N;
a read access of a column of the weight matrix is sequenced over the same number of sub-steps within a time step as a read access of a row of the weight matrix; and
a write access of a column of the weight matrix is sequenced over the same number of sub-steps within a time step as a write access of a row of the weight matrix.

* * * * *